(12) United States Patent
Chen et al.

(10) Patent No.: US 8,059,911 B2
(45) Date of Patent: Nov. 15, 2011

(54) DEPTH-BASED IMAGE ENHANCEMENT

(75) Inventors: Liang-Gee Chen, Taipei (TW);
Chao-Chung Cheng, Taipei (TW);
Chung-Te Li, Taipei (TW); Ling-Hsiu Huang, Tainan (TW)

(73) Assignees: Himax Technologies Limited, Tainan County (TW); National Taiwan University, Taipei (TW)

( * ) Notice: Subject to any disclaimer, the term of this patent is extended or adjusted under 35 U.S.C. 154(b) by 670 days.

(21) Appl. No.: 12/242,672

(22) Filed: Sep. 30, 2008

(65) Prior Publication Data

US 2010/0080485 A1   Apr. 1, 2010

(51) Int. Cl.
*G06K 9/40* (2006.01)

(52) U.S. Cl. ........ 382/266; 382/164; 382/254; 382/300; 382/154; 382/118; 342/25; 342/179; 342/180; 342/181; 342/191

(58) Field of Classification Search .................. 382/266, 382/264, 254, 300, 154, 118; 342/25, 179, 342/180, 181, 191
See application file for complete search history.

(56) References Cited

U.S. PATENT DOCUMENTS

2004/0218269 A1* 11/2004 Divelbiss et al. ............. 359/464
2009/0144173 A1*  6/2009 Mo et al. ......................... 705/27
* cited by examiner

*Primary Examiner* — Mike Rahmjoo
(74) *Attorney, Agent, or Firm* — Stout, Uxa, Buyan & Mullins, LLP

(57) ABSTRACT

A depth-based image enhancement system is disclosed. A depth estimation unit generates three-dimensional (3D) depth information from a two-dimensional (2D) image. Subsequently, an image enhancement unit enhances the 2D image according to the 3D depth information.

18 Claims, 4 Drawing Sheets

DEPTH-BASED IMAGE ENHANCEMENT

BACKGROUND OF THE INVENTION

1. Field of the Invention

The present invention generally relates to image enhancement, and more particularly to depth-based image or video enhancement.

2. Description of the Prior Art

When three-dimensional (3D) objects are mapped onto a two-dimensional (2D) image plane by prospective projection, such as an image taken by a still camera or video captured by a video camera, a lot of information, such as the 3D depth information, disappears because of this non-unique many-to-one transformation. That is, an image point cannot uniquely determine its depth. Recapture or generation of the 3D depth information is thus a challenging task that is crucial in recovering a full, or at least an approximate, 3D representation, which may be used in image enhancement, image restoration or image synthesis, and ultimately in image display.

Image enhancement is an important aspect in the processing of both digital image and video information. To a large extent, image enhancement is applied in nearly all digital image processing tasks. In one hand, the image enhancement is utilized to improve the image quality, such as the contrast and the brightness. On the other hand, the image enhancement is utilized to prepare or preprocess an image for subsequent image processing.

Image edge enhancement or detection is one of the important image enhancement operations. Typical image edge enhancement emphasizes and shows the edge details of an image, such as the outlines of objects within the image, while retaining or even suppressing other portions of the image.

Two-dimensional (2D) frequency transform is conventionally applied to a 2D image that is to be edge-enhanced. The frequency transform converts an image from a spatial-domain representation of brightness into a frequency-domain representation of frequency components. The magnitude of the high-frequency component(s), or the edge information, of the frequency-transformed image is then increased or enhanced, resulting in an edge-enhanced image. This method disadvantageously gives little consideration to the distinct depth information among different edges. Accordingly, the respective edges are monotonously assigned the same depth value.

For reasons including the that conventional methods could not faithfully enhance an image, a need has arisen to propose a system and method of depth-based image/video enhancement that can enhance an image while considering respective 3D depth information.

SUMMARY OF THE INVENTION

In view of the foregoing, it is an object of the present invention to provide a novel depth-based image/video enhancement system and method that faithfully improves the quality of the image with 3D depth information.

According to one embodiment, the present invention provides a depth-based image enhancement system. A depth estimation unit generates three-dimensional (3D) depth information from a two-dimensional (2D) image. Subsequently, an image enhancement unit enhances the 2D image according to the 3D depth information. In the image enhancement unit of the embodiment, a depth-based edge enhancement unit emphasizes edge details of the 2D image. A depth-based contrast adjustment unit enhances contrast characteristics of the luma component, and a depth-based saturation adjustment unit enhances saturation characteristics of the chroma component.

DETAILED DESCRIPTION OF THE INVENTION

Figure 1A:
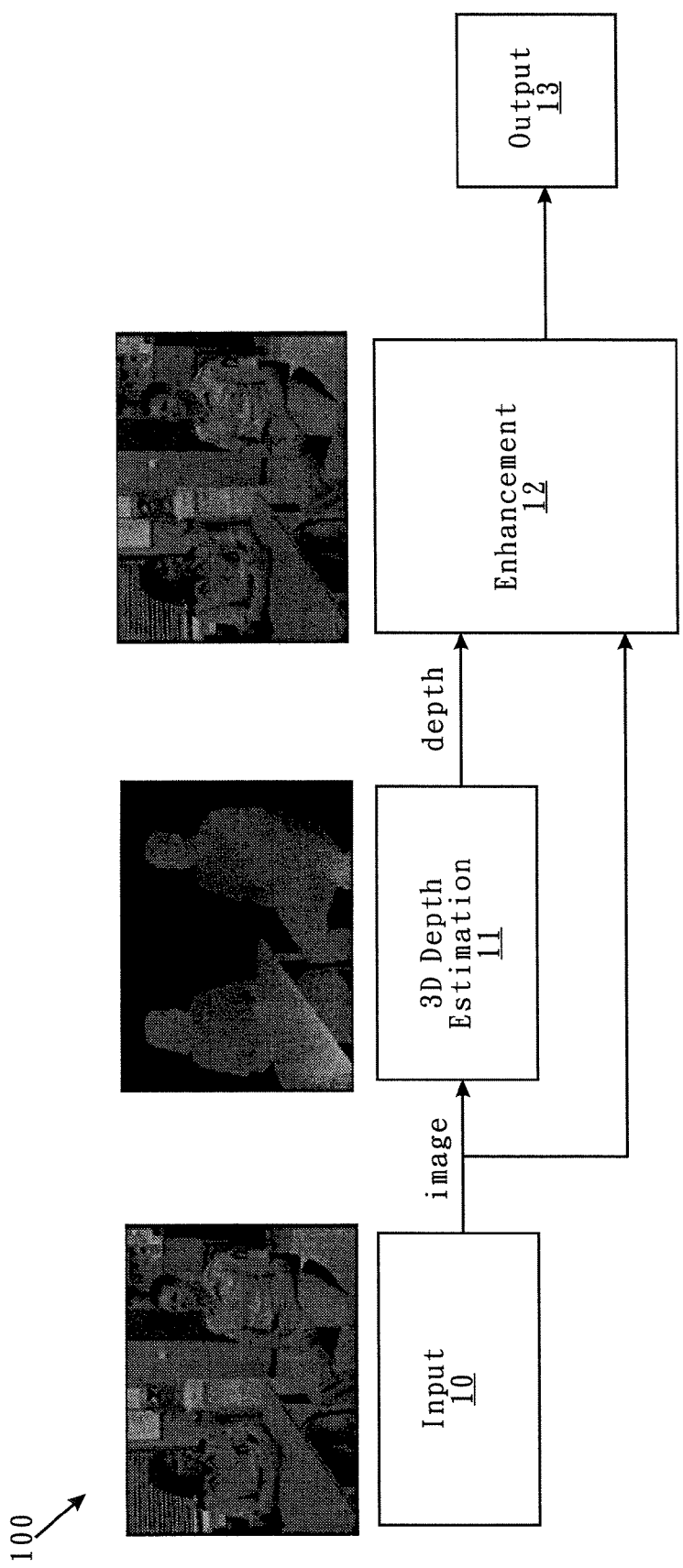
FIG. 1A illustrates a block diagram of a depth-based image/video enhancement system, including an image enhancement unit, according to one embodiment of the present invention.
Figure 1B:
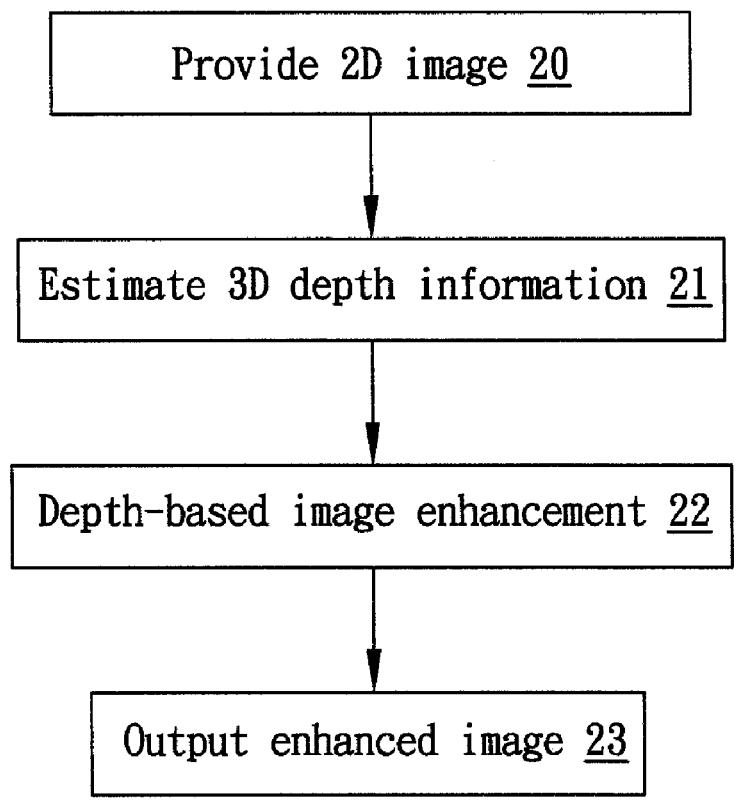
FIG. 1B illustrates an associated flow diagram demonstrating the steps of a depth-based image/video enhancement method, including a depth-based image enhancement step, according to the embodiment of the present invention.

FIG. 1A illustrates a block diagram of a depth-based image and/or video enhancement device or system 100 according to one embodiment of the present invention. Exemplary images, including an original image, images during the processing, and a resultant image, are also included in the figure for better comprehension of the embodiment. FIG. 1B illustrates an associated flow diagram demonstrating steps of the depth-based image/video enhancement method according to the embodiment of the present invention.

An input device 10 (FIG. 1A) provides or receives one or more two-dimensional (2D) input image(s) to be image/video processed (FIG. 1B, step 20) in accordance with the embodiment of the present invention. The input device 10 may in general be an electro-optical device that maps three-dimensional (3D) object(s) onto a 2D image plane by prospective projection. In one embodiment, the input device 10 may be a still camera that takes the 2D image, or a video camera that captures a number of image frames. The input device 10, in another embodiment, may be a pre-processing device that performs one or more of digital image processing tasks, such as image enhancement, image restoration, image analysis, image compression and image synthesis. Moreover, the input device 10 may further include a storage device, such as a semiconductor memory or hard disk drive, which stores the processed image from the pre-processing device. As discussed above, a lot of information, particularly the 3D depth information, is lost when the 3D objects are mapped onto the 2D image plane, and therefore, according to an aspect of the invention, the 2D image provided by the input device 10 is subjected to image/video processing through other blocks of the depth-based image/video enhancement system 100, as discussed below.

Subsequently, the 2D image provided by the input device 10 is processed by a 3D depth estimation unit 11 that generates or recaptures the 3D depth information of the objects in the image (step 21). In this specification, the term "unit" is used to denote a circuit, software, such as a part of a program, or their combination. The 3D depth estimation unit 11 may be a conventional circuit or algorithm that generates 3D depth information from a given 2D image. Alternatively, the 3D depth estimation unit 11 may be a novel circuit or algorithm that utilizes a technique or techniques disclosed in the following copending US patent applications owned by the same assignee as the present application: "3D Depth Generation by Vanishing Line Detection" by Liang-Gee Chen et al., "3D Depth Generation by Block-based Texel Density Analysis" by Liang-Gee Chen et al., and "3D Depth Generation by Local Blurriness Estimation" by Liang-Gee Chen et al., the disclosures of which are hereby incorporated by reference.

The 3D depth information generated by the 3D depth estimation unit 11 and the original 2D image provided by the input device 10 are both forwarded to an image enhancement (or adjustment) unit 12 (step 22). In the embodiment, the image enhancement unit 12 improves the edge, contrast and saturation of the original 2D image. Furthermore, the image enhancement unit 12, according to the embodiment, performs this image processing according to the 3D depth information such that the edge details, for example the outlines of objects belonging to respective area(s) within the image, are separately emphasized or enhanced with distinct degree(s) with respect to associated distinct depth(s). For example, the outline of an object having smaller depth value (that is, closer to the viewer) is enhanced with a larger degree (or enhancing weighting) than the outline of an object having a larger depth value (that is, more distant to the viewer). Implementation of the image enhancement may be by way of a conventional or future image enhancement technique, including spatial domain enhancement and frequency domain enhancement.

Figure 2A:
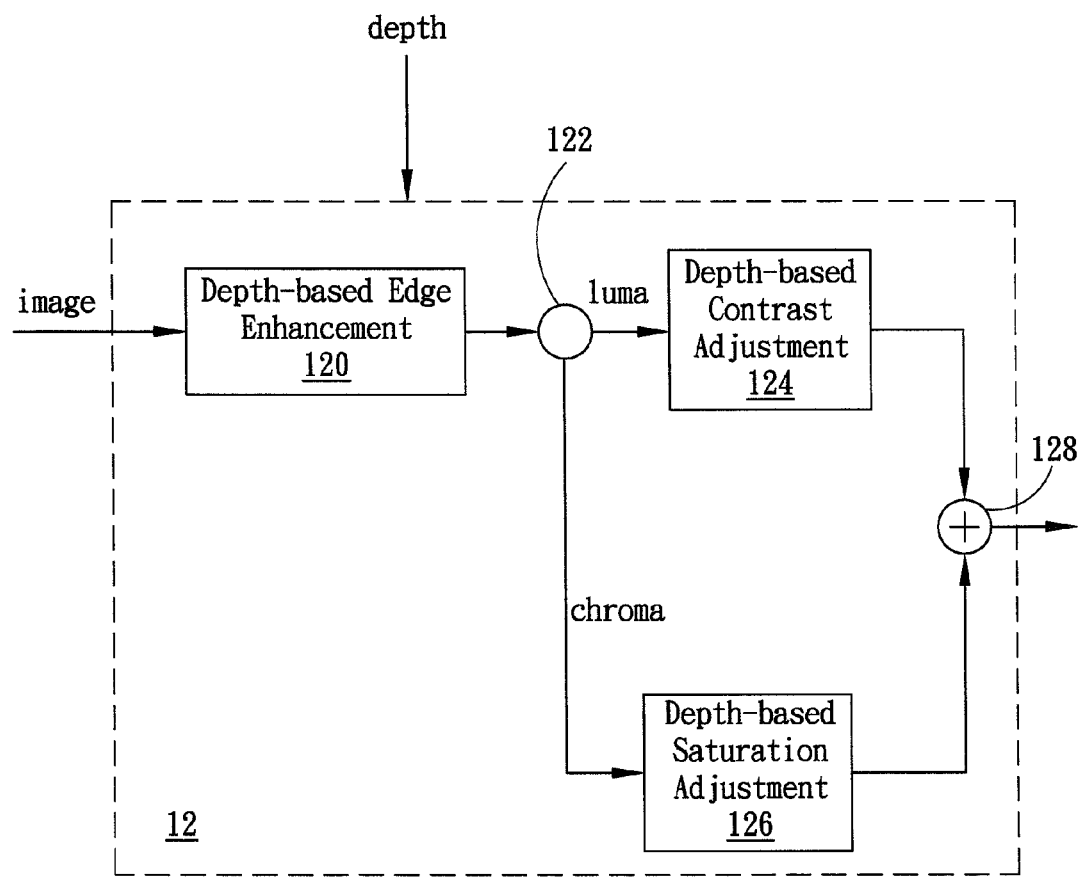
FIG. 2A illustrates a detailed block diagram of the image enhancement unit of FIG. 1A according to one embodiment of the present invention.
Figure 2B:
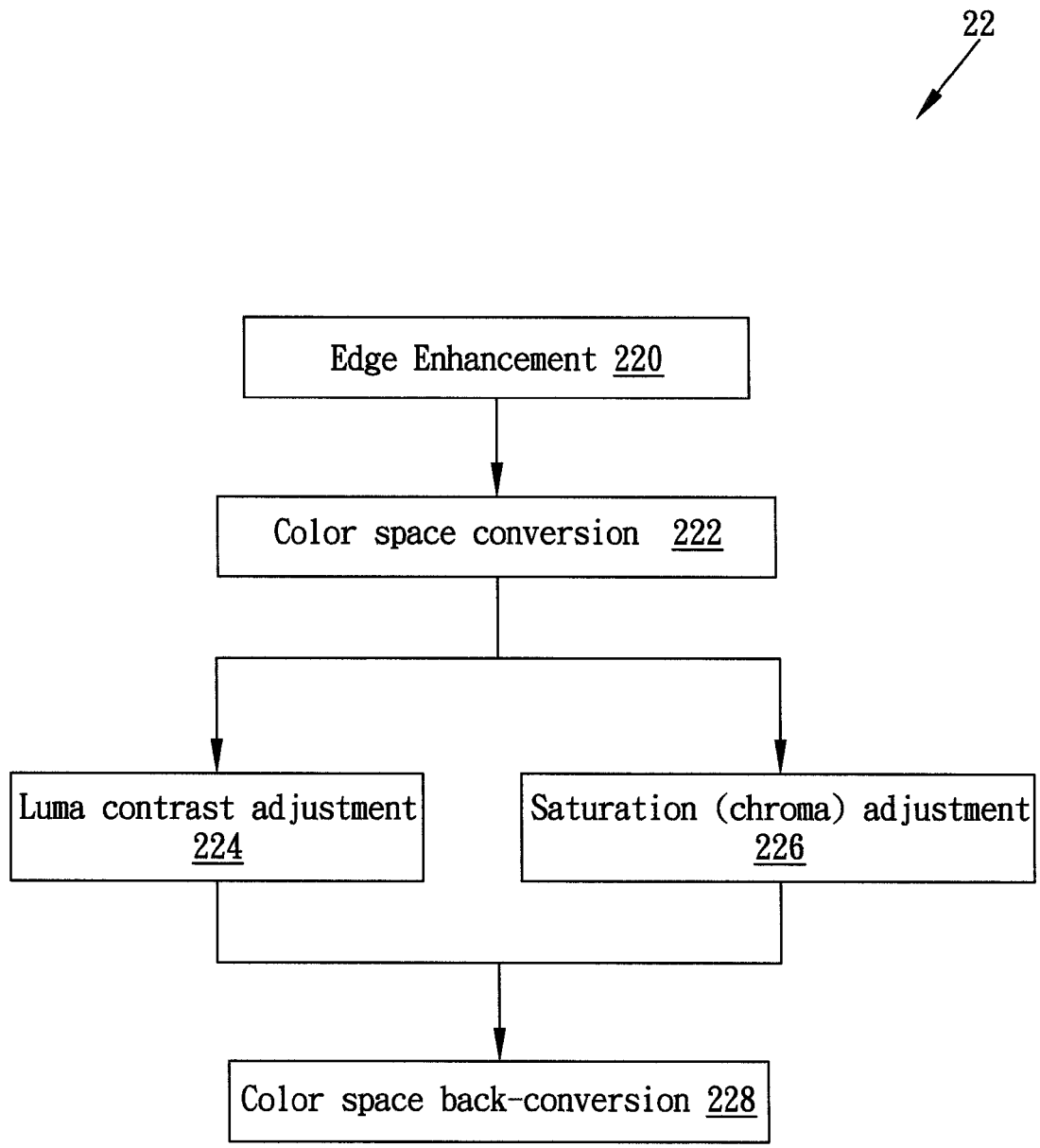
FIG. 2B illustrates an associated detailed flow diagram demonstrating sub-steps of the depth-based image enhancement step of FIG. 1B according to the embodiment of the present invention.

FIG. 2A illustrates a detailed block diagram of the image enhancement unit 12 according to one embodiment of the present invention, and FIG. 2B illustrates an associated detailed flow diagram demonstrating the sub-steps of the depth-based image enhancement step according to the embodiment of the present invention.

In these two figures, the 2D image is first inputted to and/or processed by edge enhancement 120 (step 220) to emphasize and show the edge details of the image. Particularly, the performance of the edge enhancement is depth based. Specifically, objects having smaller depth (that is, closer to the viewer) are enhanced with larger weight, and vice versa. The weighting values may be obtained through experimental trials, and may vary according to the needs of specific applications. In the embodiment, edge enhancement is carried out by, but not limited to, a high-pass filtering technique that uses a spatial convolution mask, followed by pixel group processing that applies the mask on a group of pixels surrounding a center pixel.

The edge enhancement 120 outputs an edge-enhanced image, which is then converted, if necessary, from red/green/blue (RGB) color space to hue/saturation/intensity (HSI) color space by a converter 122 (step 222). It is appreciated by a person skilled in the pertinent art that the color space conversion may be omitted if the converted image data have been provided in advance. Further, although the HSI color space is discussed in the embodiment, other similar color space, such as hue/saturation/lightness (HSL) or hue/saturation/value (HSV), may be used. The converted image data primarily includes luma component(s) and chroma component(s).

In the embodiment, the luma component is inputted to and/or processed by contrast adjustment (or enhancement) 124 (step 224) to enhance its contrast characteristics. Particularly, performance of the contrast adjustment is depth based. Specifically, objects having smaller depth (that is, closer to the viewer) are adjusted with larger weight, and vice versa. The weighting values may be obtained through experimental trials, and may vary according to the need of specific applications. In the embodiment, the contrast adjustment is carried out by, but not limited to, a histogram stretching technique that increases the value of pixels having gray level (in the histogram) greater than a threshold while decreasing the value of pixels having gray level smaller than the threshold.

On the other hand, the saturation of the chroma component is inputted to and/or processed by saturation adjustment (or enhancement) 126 (step 226) to enhance its saturation characteristics or the purity of the color/hue. Particularly, performance of the saturation adjustment is depth based. Specifically, objects having smaller depth (that is, closer to the viewer) are adjusted with larger weight, and vice versa. The weighting values may be obtained through experimental trials, and may vary according to the needs of specific applications.

Subsequently, the contrast-adjusted luma component of the contrast adjustment 124 and the saturation-adjusted chroma component of the saturation adjustment 126 are converted (block 128 and step 228), if necessary, from the HSI color space back to the RGB color space. It is appreciated by a person skilled in the pertinent art that the color space back-conversion may be omitted, or at least be temporarily withheld. Further, although the edge enhancement 120 is performed before the contrast and saturation adjustments 124/126 in the embodiment, the performing sequence may be reversed in another embodiment. Moreover, one or more of the edge enhancement 120, the contrast adjustment 124 and the saturation enhancement 126 may be omitted according to the needs of specific applications.

An output device 13 (FIG. 1A) receives the enhanced image from the image enhancement unit 12 and provides the resulting or output image (FIG. 1B, step 23). The output device 13, in one embodiment, may be a display device for presentation or viewing of the received enhanced image. The output device 13, in another embodiment, may be a storage device, such as a semiconductor memory or hard disk drive, which stores the received enhanced image. Moreover, the output device 13 may further, or alternatively, include a post-processing device that performs one or more of digital image processing tasks, such as image restoration, image analysis, image compression or image synthesis.

According to the embodiments of the present invention as discussed above, the present invention faithfully improves the quality of the image, such as the edge, the contrast or the saturation, or other further characteristics, such as the texture features, spatial characteristics, noise or blurriness.

Although specific embodiments have been illustrated and described, it will be appreciated by those skilled in the art that various modifications may be made without departing from the scope of the present invention, which is intended to be limited solely by the appended claims.

What is claimed is:

1. A device for performing one or more of depth-based image enhancement and depth-based video enhancement, the device comprising:
    a depth estimation unit that generates three-dimensional (3D) depth information from a two-dimensional (2D) image;
    an image enhancement unit that enhances the 2D image according to the 3D depth information, wherein the image enhancement unit comprises one or more of the following elements:
    a depth-based edge enhancement unit that emphasizes edge details of the 2D image; a color space converter that converts the 2D image between color spaces to obtain a luma component and a chroma component of the 2D image; a depth-based contrast adjustment unit that enhances contrast characteristics of the luma component; a depth-based saturation adjustment unit that enhances saturation characteristics of the chroma component; and a color space back-converter that converts the adjusted luma and chroma components back to a color space of the original 2D image, wherein the color space converter converts the 2D image from red/green/blue (RGB) color space to hue/saturation/intensity (HSI) color space, and wherein the color space back-converter converts the enhanced 2D image from the HSI color space back to the RGB color space.

2. The device of claim 1, wherein the image enhancement unit enhances objects in the 2D image having smaller depth value with larger enhancing weighting, and enhances objects in the 2D image having larger depth value with smaller enhancing weighting.

3. The device of claim 1, wherein the image enhancement unit enhances one or more of edge, contrast and saturation characteristics.

4. The device of claim 1, wherein the depth-based edge enhancement unit comprises: a spatial convolution mask that is applied on a group of pixels of the 2D image surrounding a center pixel.

5. The device of claim 1, wherein the depth-based contrast adjustment unit comprises: histogram stretching means for increasing a value of pixels having a gray level greater than a threshold, while decreasing a value of pixels having a gray level smaller than the threshold.

6. The device of claim 1, further comprising an input device that receives the 2D image.

7. The device of claim 6, wherein the input device further stores the 2D image.

8. The device of claim 1, further comprising an output device that receives the enhanced 2D image.

9. The device of claim 8, wherein the output device further stores or displays the enhanced 2D image.

10. A method of using a device to perform one or more of depth-based image enhancement and depth-based video enhancement, the method comprising:

using a processor to perform the steps of:

generating three-dimensional (3D) depth information from a two-dimensional (2D) image;

enhancing the 2D image according to the 3D depth information, wherein the enhancing step comprises one or more of the following sub-steps:

enhancing edge details of the 2D image based on the 3D depth information; converting the 2D image between color spaces to obtain a luma component and a chroma component of the 2D image; adjusting contrast characteristics of the luma component based on the 3D depth information; adjusting saturation characteristics of the chroma component based on the 3D depth information; and converting the adjusted luma and chroma components back to a color space of the original 2D image; wherein the 2D image converting sub-step converts the 2D image from red/green/blue (RGB) color space to hue/saturation/intensity (HSI) color space, and wherein the luma/chroma back-converting sub-step converts the enhanced 2D image from the HSI color space back to the RGB color space.

11. The method of claim 10, wherein the enhancing step is performed by enhancing objects in the 2D image having smaller depth value with larger enhancing weighting, and enhancing objects in the 2D image having larger depth value with smaller enhancing weighting.

12. The method of claim 10, wherein the enhancing step is performed to enhance one or more of edge, contrast and saturation characteristics.

13. The method of claim 10, wherein the edge-details enhancing sub-step comprises: applying a spatial convolution mask on a group of pixels of the 2D image surrounding a center pixel.

14. The method of claim 10, wherein the contrast-characteristics adjusting sub-step comprises: increasing a value of pixels having a gray level greater than a threshold, while decreasing a value of pixels having a gray level smaller than the threshold.

15. The method of claim 10, further comprising a step of receiving the 2D image.

16. The method of claim 15, further comprising a step of storing the 2D image.

17. The method of claim 10, further comprising a step of receiving the enhanced 2D image.

18. The method of claim 17, further comprising a step of storing or displaying the enhanced 2D image.

* * * * *